March 12, 1946.  E. D. BOISSELIER  2,396,243
MOTION PICTURE PROJECTOR
Filed Sept. 17, 1943  4 Sheets-Sheet 1
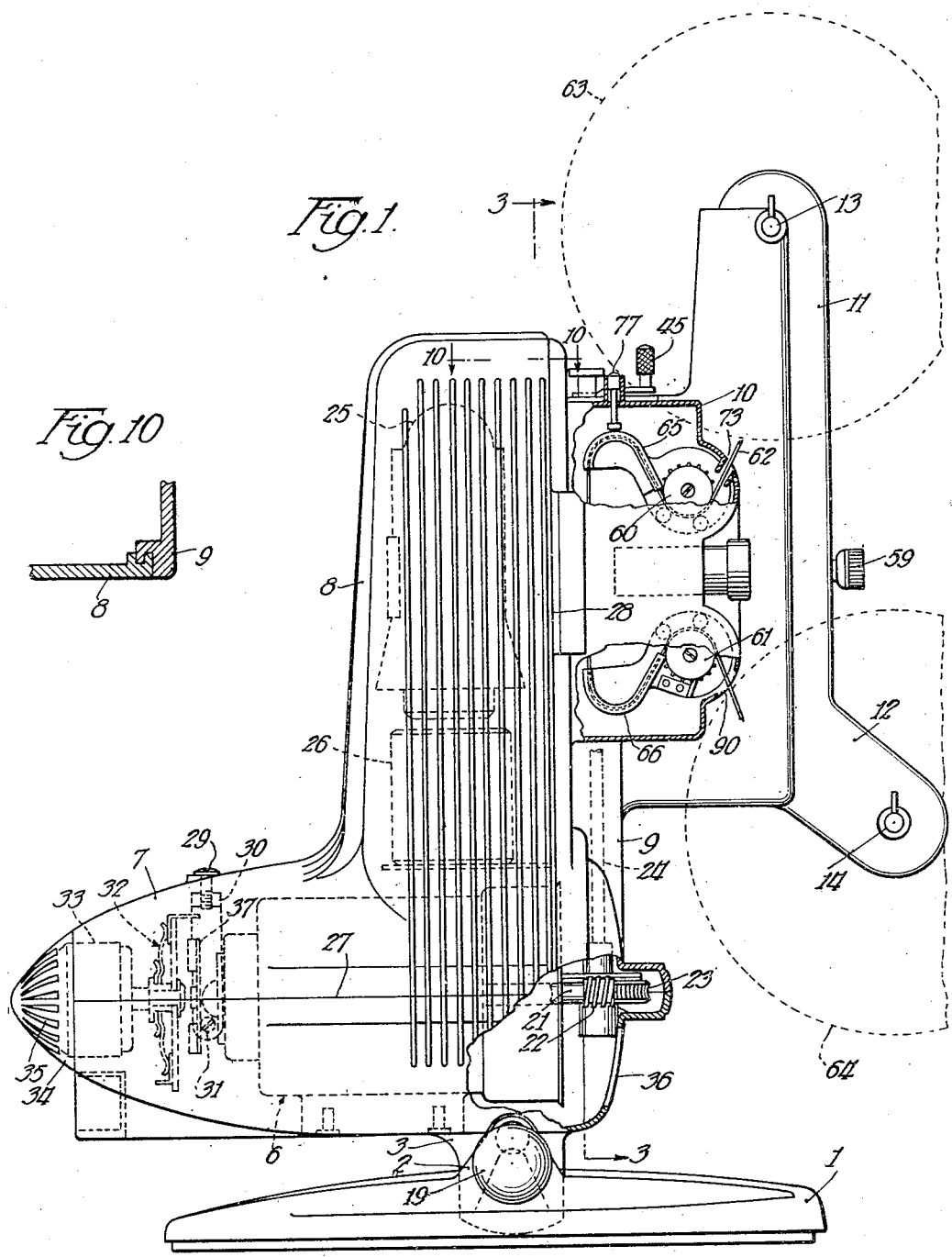
Inventor
Earl D. Boisselier
By: Robert L. Burton Atty.

March 12, 1946.　　E. D. BOISSELIER　　2,396,243
MOTION PICTURE PROJECTOR
Filed Sept. 17, 1943　　4 Sheets-Sheet 2
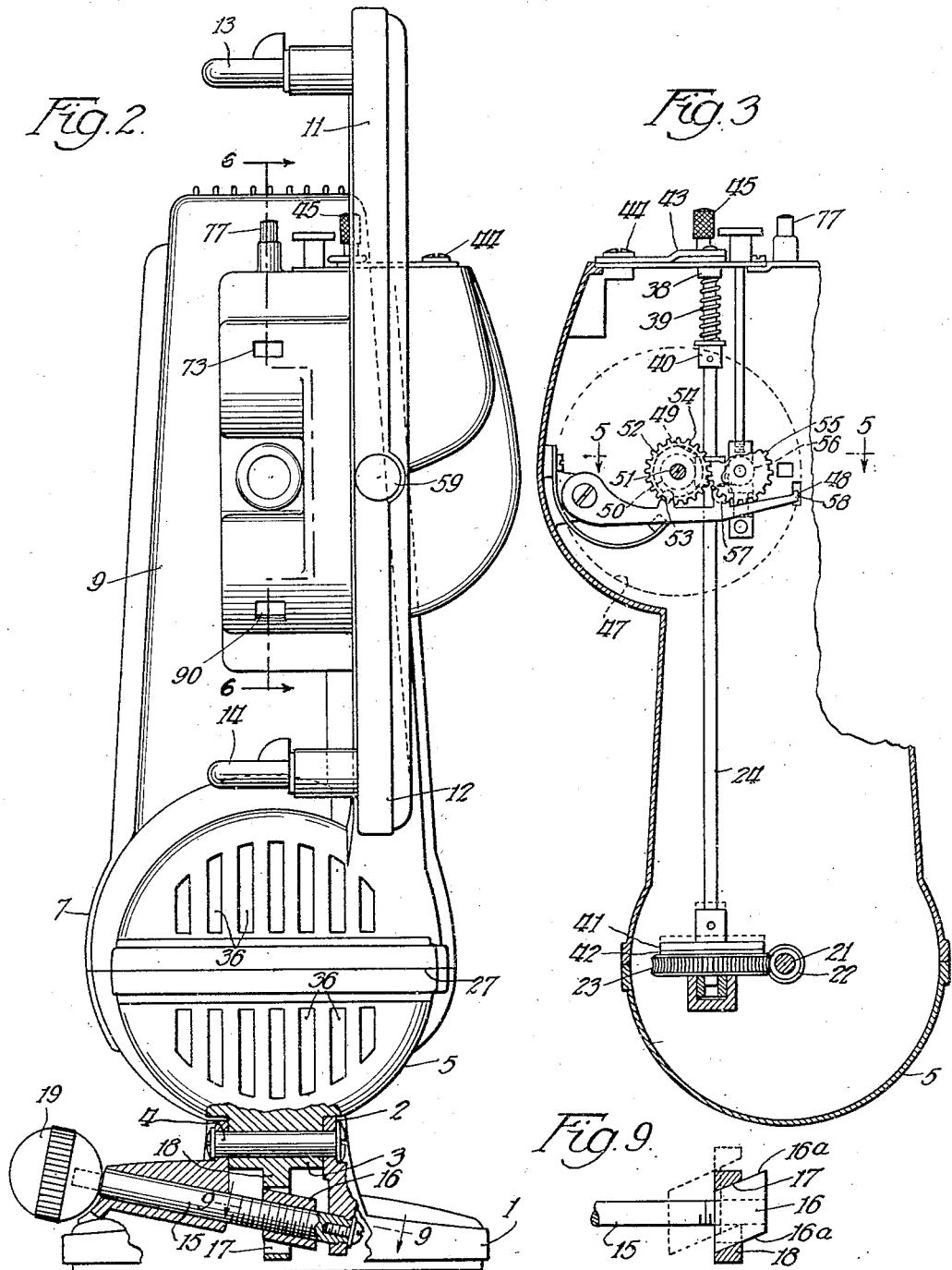

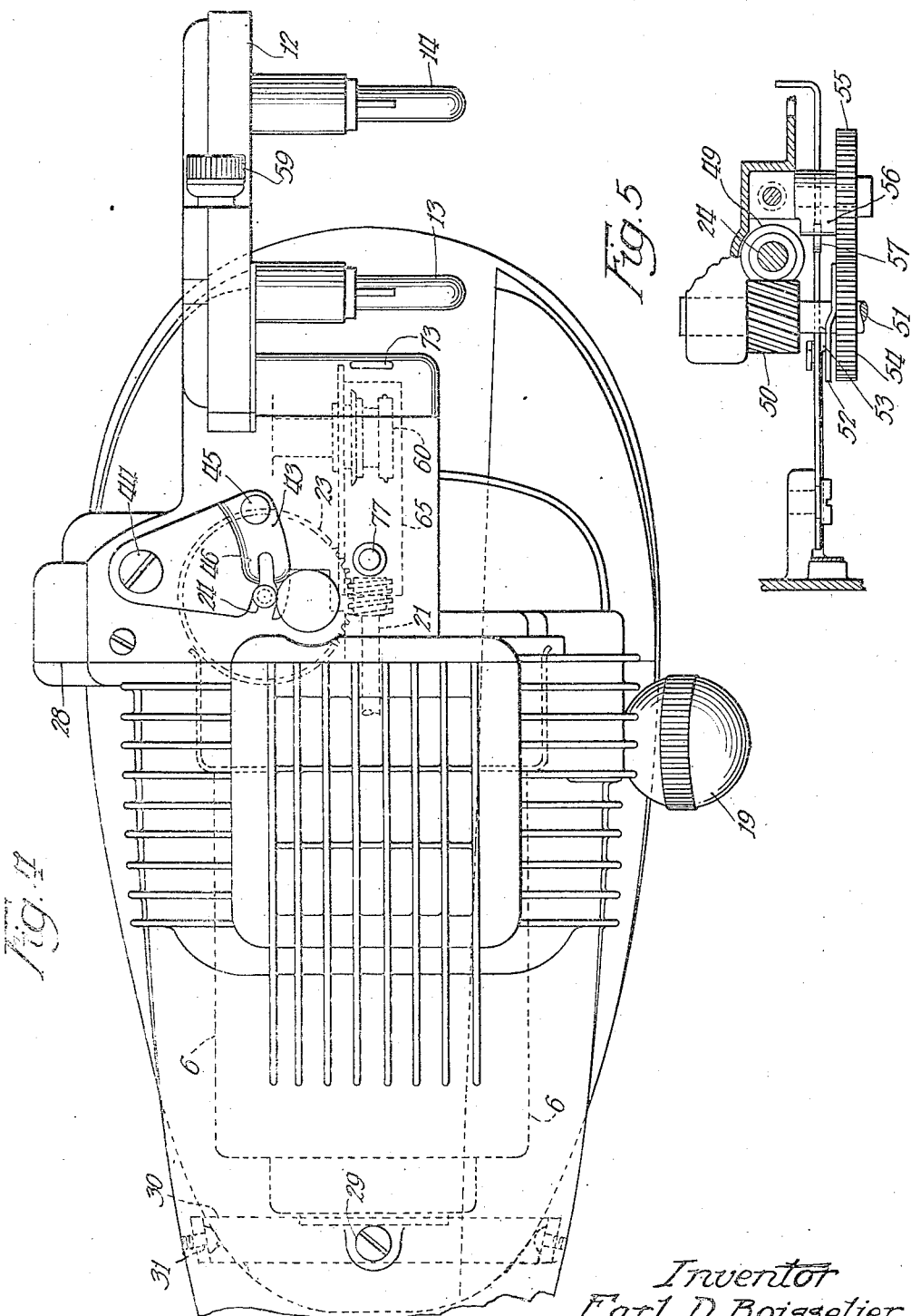

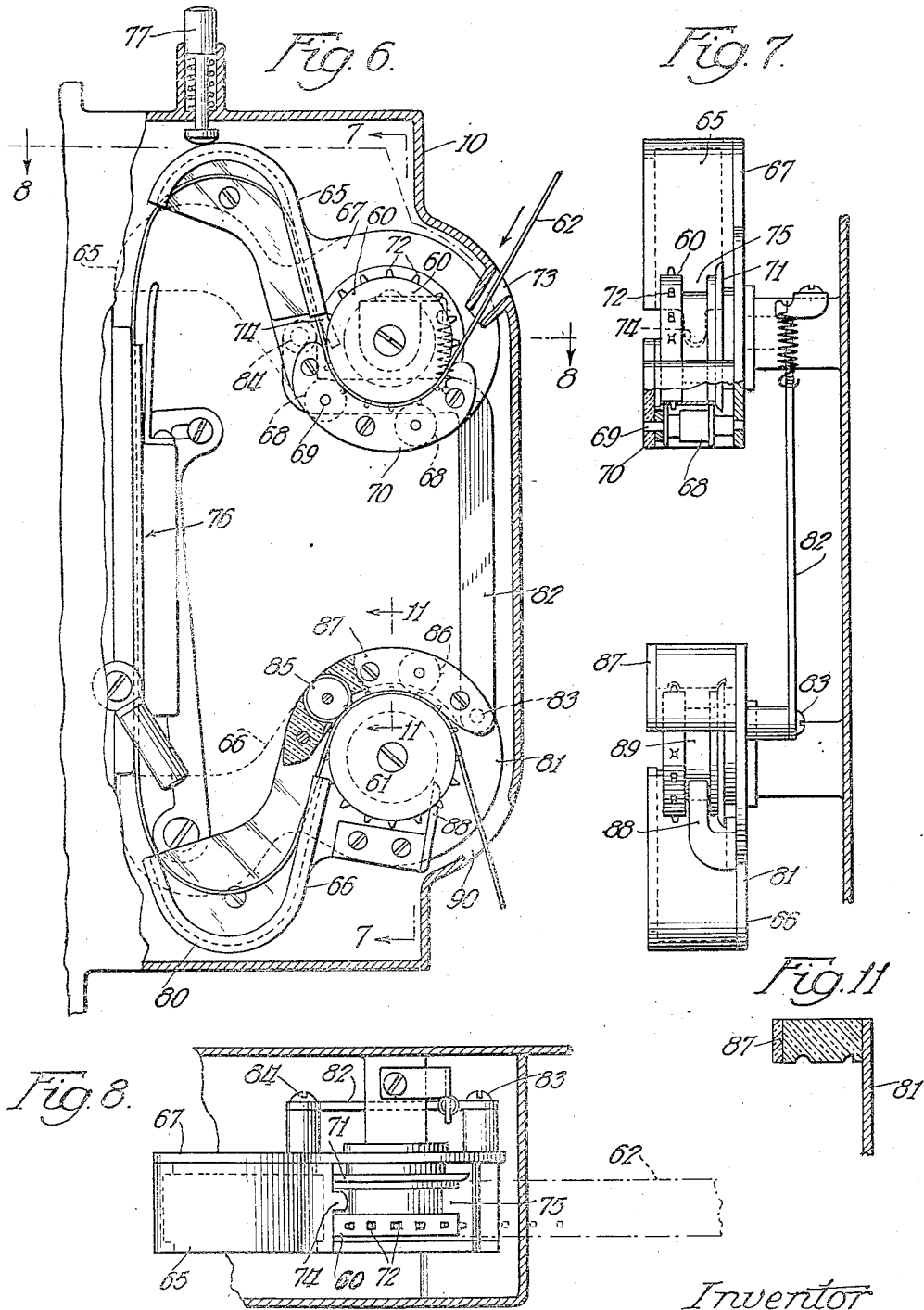

Patented Mar. 12, 1946

2,396,243

UNITED STATES PATENT OFFICE 2,396,243

MOTION-PICTURE PROJECTOR

Earl D. Boisselier, Glen Ellyn, Ill., assignor to Sears, Roebuck and Co., Chicago, Ill., a corporation of New York Application September 17, 1943, Serial No. 502,768

2 Claims. (Cl. 88—17)

This invention relates to motion picture projecting machines and one object of the invention is to provide a simplified housing for such a machine embodying a minimum number of interfitting parts, at least one of which is readily removable to afford access to the mechanism enclosed therein.

Another object of the invention is to provide a motion picture projector having a driving motor located closely adjacent the base whereby the center of gravity of the entire machine is kept low and the device is stabilized upon its base.

A further object of the invention is to provide a motion picture projector with a substantially automatic film threading device by which one end of the film upon being entered at the proper point in the mechanism is automatically fed through and around the various guide devices to a point of emergence at which it is available for attachment to the winding reel.

The invention also includes a novel means of adjustment for tilting the projector bodily with respect to its base so as to direct the light rays as desired.

Other objects and advantages will appear from the following description taken in connection with the drawings in which:

Fig. 1 is a side elevation of a motion picture projector embodying this invention with certain portions of the housing broken away to reveal features of the film-threading mechanism and with the film carrying reels indicated in dotted outline.

Fig. 2 is a front elevation of the projector with portions of the base shown in section to reveal the adjusting means for tilting the projector upon the base.

Fig. 3 is a vertical sectional view taken as indicated at line 3—3 on Fig. 1.

Fig. 4 is a top plan view of the projector.

Fig. 5 is a detail section taken as indicated at line 5—5 on Fig. 3 and on a somewhat larger scale.

Fig. 6 is a vertical sectional view taken approximately on line 6—6 of Fig. 2 of the portion of the housing containing the film threading mechanism, showing the latter in elevation on a larger scale than in Fig. 1.

Fig. 7 is a vertical section taken as indicated at line 7—7 on Fig. 6.

Fig. 8 is a horizontal detail section taken as indicated at line 8—8 on Fig. 6.

Fig. 9 is a detail sectional view taken as indicated at line 9—9 on Fig. 2.

Fig. 10 is a detail section taken as indicated at line 10—10 on Fig. 1.

Fig. 11 is a detail section taken as indicated at line 11—11 on Fig. 6.

While there is shown and described herein certain specific structure embodying the invention, it will be manifest to those skilled in the art that various modifications and re-arrangements of the parts may be made without departing from the spirit and scope of the invention, and that the same is not limited to the particular forms herein disclosed, except insofar as indicated by the appended claims.

As shown in the drawings the motion picture projector which is the subject of this invention is supported upon a base 1 and is enclosed in a housing which is tiltably attached to the base by means of spaced lugs 2, 2, extending upwardly from the base and embracing a lug 3 on the lower portion of the housing. A pivot bolt 4 extending through the lugs 2 and 3 connects the housing to the base. The housing itself consists of three main sections, including a lower portion or shell 5 in which the driving motor 6 is carried. An upper section includes a cover portion 7 for the motor and a lamp house 8 integral therewith and upstanding therefrom. The third section comprises a front wall 9 for the lamp house with an enclosing casing 10 in which the film threading means, drive gearing and projecting lenses are supported, together with bracket arms 11 and 12 which carry the reel spindles 13 and 14, respectively.

For tilting the housing through a limited range upon its base 1 there is journaled in the base an adjusting screw 15 which carries a traveler nut 16 fitting in a slot 17 formed in a depending lug 18 which is integral with the mounting lug 3 of the housing. For convenience the screw 15 is obliquely disposed in the base 1 with its operating knob 19 exposed at one side thereof. Opposite vertical faces 16a of the traveler nut 16 are oblique to the axis of the nut and slidably engage correspondingly oblique faces of the slot 17 as shown in Fig. 9, so that as the nut is shifted along the screw 15 by rotation of the latter it causes the lug 18 to be rocked forward or backward about the supporting pivot 4 and correspondingly adjusts the angular position of the housing as a whole.

The driving motor 6 is indicated mainly in dotted outline in Figure 1 and a portion of the lower shell 5 is broken away to show the drive shaft 21 of the motor with its driving worm 22 meshing with the worm gear 23 on a vertical shaft 24. In the upper portion of the hollow casing designated as the lamp house 8 the lamp is indicated in dotted outline at 25, supported in a suitable base or socket 26 in the usual manner. To afford access to the lamp 25 the upper portion 7, 8 of the housing may be separated from the lower shell 5 at the horizontal parting line 27 and from the upstanding plate 9 at the vertical parting line 28. A retaining screw 29 engages a yoke or frame member 30 which is permanently secured as by screws 31 in the bottom of the shell 5 and is arched over the motor control switch indicated in dotted outline at 32 adjacent the inner end of the motor 6. Loosening the screw 29 releases the upper housing section 7, 8 from the lower section 5 and renders it readily removable. The forward edges of the lamp house portion 8 may be slidably engaged with the vertical plate portion 9 by an interlocking tongue and groove formation as indicated in detail section in Figure 10.

The switch 32 may be understood as controlling the lamp 25 and coaxially arranged therewith is a rheostat 33 indicated in dotted outline in Figure 1. The rear tip portion 34 of the streamlined housing may thus be rotatably mounted to operate a rotatable member of the rheostat 33 and also the rotatably adjustable portion of the switch 32 for controlling the lamp 25 and the operation of the motor 6. Preferably this knob or terminal member 34 is formed with slits or apertures 35 which cooperate with openings 36 in the front wall of the housing to provide for air circulation to cool the motor, a small fan 37 on the motor shaft serving to facilitate the flow of air to the housing.

The shaft 24 which is driven by the motor through worm gears 22 and 23 extends upwardly in the front panel 9 to a bearing 38 with a spring 39 coiled about the shaft and reacting between said bearing and a collar 40 on the shaft to press the shaft downwardly so as to normally hold its clutch plate 41 in driving contact with a rubber facing 42 which is carried by the upper surface of the gear 23 and forms the cooperating clutch member. When it is desired to disconnect the shaft 24 from the driving motor a segment plate 43 pivoted at 44 on the top wall of the casing 10 is swung through a limited arc by means of its crank handle 45 so as to cause the thickened cam portion 46 of the plate 43 to be wedged under a flange on the upper end of the shaft 24 so as to raise the shaft in opposition to the force of the spring 39 and separate the clutch members 41 and 42.

One function of the shaft is to drive the shutter disc indicated in dotted outline at 47 on Fig. 3 and also to drive the film feeding dog 48 shown in said figure. For the latter purpose the shaft 24 carries a spiral gear 49 meshing with a spiral gear 50 or a shaft 51 which carries a face cam 52 engaging a lug 53 on the arm of the dog 48. The cam 52 has associated with it a gear 54 which meshes with a similar gear 55 having a hub 56 formed as a cam operating against a second follower lug 57 on the arm of the dog 48 as seen in Fig. 3. The face cam 52 swings the arm of the dog 48 through a slot 58 for engagement and disengagement with successive holes in the edge of the picture film and the cam 56 actuates the dog vertically for driving the film through a limited distance corresponding to the size of one frame or picture thereon at each stroke of the driving dog 48. The actuation of the dog 48 is similar to that employed in previous mechanisms and it is described primarily to indicate that the shifting of the drive shaft 24 for disconnecting the clutch members 41 and 42 will not disturb the dog driving mechanism since it merely requires the spiral gear 49 to be moved axially a short distance without disengaging it from the spiral gear 50 with which it meshes.

It may be understood that one or both of the reel spindles 13 and 14 are driven by any suitable gearing enclosed within the hollow bracket arms 11 and 12 and connected to the drive shaft 24 by means not shown and constituting no part of this invention. The knurled knob 59 seen in Fig. 1 may be understood as carried by a horizontal shaft which is a part of this train and may be manually engaged for shifting the film driving train by limited amounts if this becomes desirable. The driving train includes toothed sprocket wheels 60 and 61 seen in Figs. 1 and 6 in which a fragment of the film is shown at 62 trained by said wheels in its normal position leading from the upper reel 63 onto the sprocket 60 and leading off from the sprocket 61 onto the reel 64. This is the normal direction of travel of the film when it is being shown but it may be understood that the direction may be reversed for rewinding it upon the original carrying reel 63.

In many projectors of this general character the threading of the film over the sprockets and through the guideway by which it is carried into engagement with the feeding dog 48 is a difficult process, but the present invention provides means by which this is greatly simplified. Guide members 65 and 66 are provided for controlling the film adjacent the sprockets 60 and 61 and insuring that it shall be correctly threaded through the machine in an automatic manner. The guide member 65 is a downwardly open hook-shaped channel carried by a back plate 67 which is pivotally mounted for limited movement about the axis of the sprocket wheel 60. The plate 67 also carries idler rollers 68 journaled on pivots 69 and these rollers are supplemented by an arcuate shoe or guide member 70 which conforms closely to the contour of the lower portion of the sprocket wheel 60 but includes a groove for the flange 71 and a second groove for the teeth 72 of the sprocket as shown in the detail sectional view Fig. 11. The housing 10 which encloses the sprockets 60 and 61 has an entry slot 73 disposed in a generally tangential relation to the sprocket 60 so that when the end of a film is entered in this slot and the driving motor is started for turning the sprocket 60 in a clockwise direction, the film will be carried around the sprocket between it and the idler rollers 68 and guide shoe 70. Then a stripper tongue 74 which extends into the central channel 75 of the sprocket wheel 60 will prevent the film from following the sprocket wheel farther and will direct it into the channeled guide member 65 from which it will emerge downwardly toward the guideway indicated at 76 in Fig. 6. To insure that the film shall enter this guideway the guide member 65 may be rocked about the axis of the sprocket 60 by depressing the button 77 in the upper wall of the casing 10 which shifts the guide 65 to the position shown in dotted outline in Fig. 6. The film then travels downwardly through the guideway 76, its perforated edge becoming engaged with the driving dog 48 which is being simultaneously moved in its orbit in the slot 58 as already described. As the film emerges from the lower end of the guideway 76 it is caught in the upwardly open hook-shaped channel guide 80 which is substantially similar to the guide member 65 and is pivotally carried for shifting about the axis of the lower sprocket 61. To effect such shifting movement automatically when the guide member 65 is shifted, the supporting plate 81 which carries the guide plate 80 is connected by a link 82 to the guide plate 67 of the upper guide 65, the pivot 83 for the lower end of the link 82 being disposed at the right hand side of the axis about which the plate 81 is to rock while the pivot 84 for the upper end of the link 82 is connected at the left hand side of the axis about which the plate 67 is to rock. As shown in Fig. 6 the upper end portion of the link 82 is bent at right angles at two points to make connection between the pivots 83 and 84 and with this arrangement the downward movement of the guide 65 caused by depressing the button 77 results in a corresponding upward movement of the guide 80 to the position shown in dotted outline in Fig. 6 at which its open end closely approaches the lower end of the guideway 76 from which the film is to emerge.

Thus, as the film is fed from the guide 76 it enters the curved channel of the guideway 80 and is directed onto the lower sprocket wheel 61, passing between the toothed surface of the wheel 61 and the idlers 85 and 86 and their associated guard shoe 87, these parts being quite similar to the corresponding elements associated with the sprocket 60. At the proper point in the circumference of the sprocket wheel 61, a suitable stripper tongue 88 is supported on the plate 81 and extends into the groove 89 of the sprocket 61 as seen in Fig. 7 so as to direct the film off the sprocket and cause it to emerge through the outlet slot 90 of the housing 10. At this point the motor will be stopped and the end of the film may be manually attached to the take-up reel 64. The machine is then ready to run for projecting the picture on the film.

I claim:

1. In a motion picture film feeding apparatus, a film gate through which film is advanced by intermittent movements, a film feeding sprocket pivotally supported adjacent the ingress terminal of said gate, a film feeding sprocket pivotally supported near the egress terminal of said gate, a pair of symmetrically opposite members each associated with one of said ingress and egress sprockets and each comprising a disc portion pivoted coaxially with its associated sprocket, a pair of guide rollers pivotally supported within an arcuate segment defining its related sprocket and serving as a peripheral guide for film, a film guide chute of curvature reverse to that of its related one of said defining segments including a straight portion directed tangentially of its related sprocket at an adjacent terminal point of its said defining segment, the opposite end of each said chutes being spaced from and having a trackway directed towards its adjacent terminal of said film gate, spring means for urging said pair of members in opposite rotary directions so that said opposite ends of said chute are normally remote from their related film gate terminals, manually actuatable means for moving one of said members in opposition to said spring means so as to dispose its said opposite end of said chute in close proximity to its related film gate terminal, and a link pivotally connected to each of said members so as to impart a symmetrically opposite movement to the other one of said members during the actuation of said manual means.

2. A motion picture film feeding mechanism comprising a film gate through which film is advanced by intermittent movements, a pair of film feeding sprockets pivotally supported and driven in similar directions, one located near each end of said film gate, a pair of symmetrically opposite film guides each associated with one of said sprockets and comprising a disc portion pivoted coaxially with its related sprocket, spring means for urging said pair of members in opposite directions away from their related terminal of said film gate, manual means for moving one of said members in opposition to its spring means, and a link connecting said one of said members to said other of said members so as to impart a symmetrically opposite movement to said other of said members in response to the manual actuation of said means.

EARL D. BOISSELIER.